UNITED STATES PATENT OFFICE.

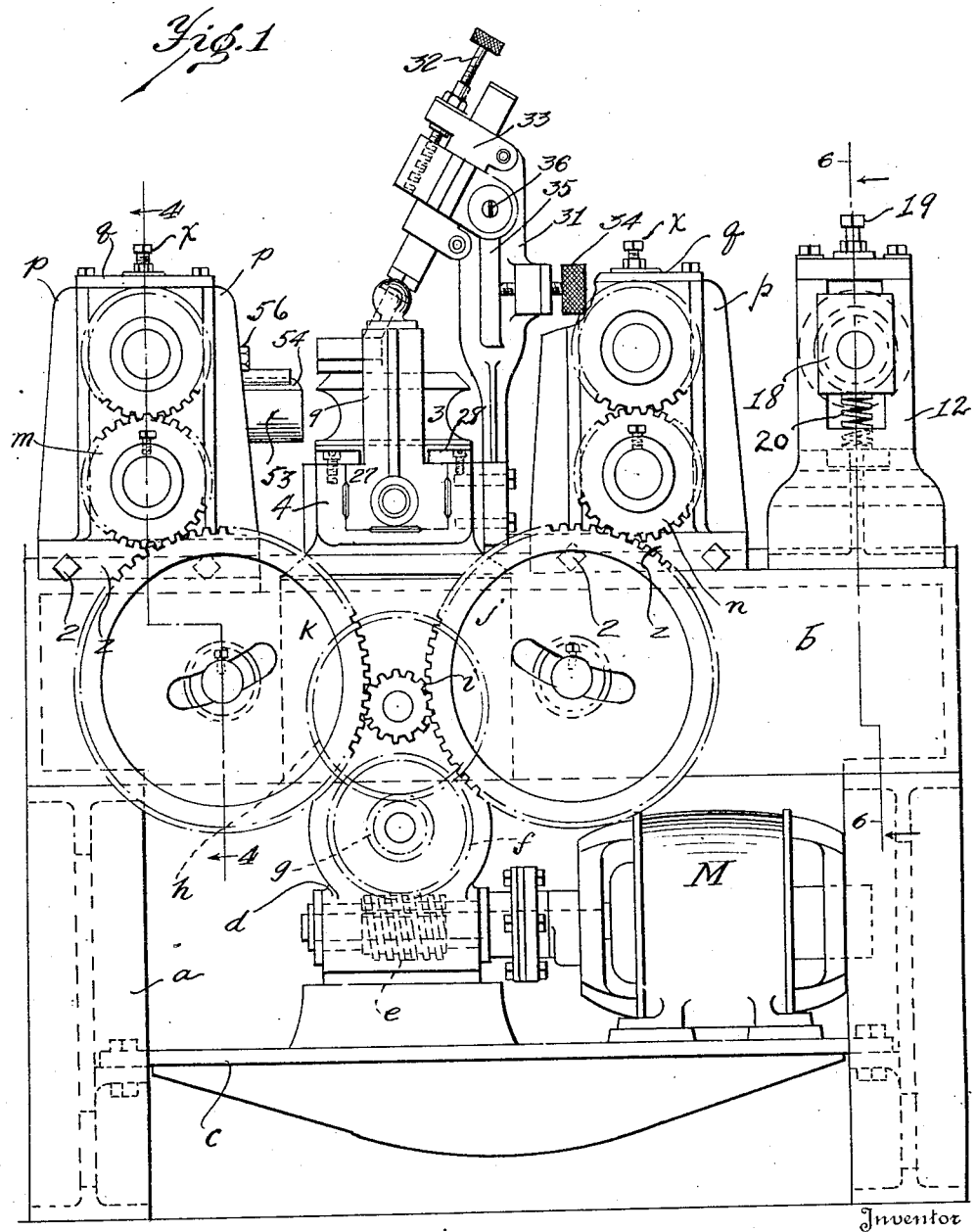

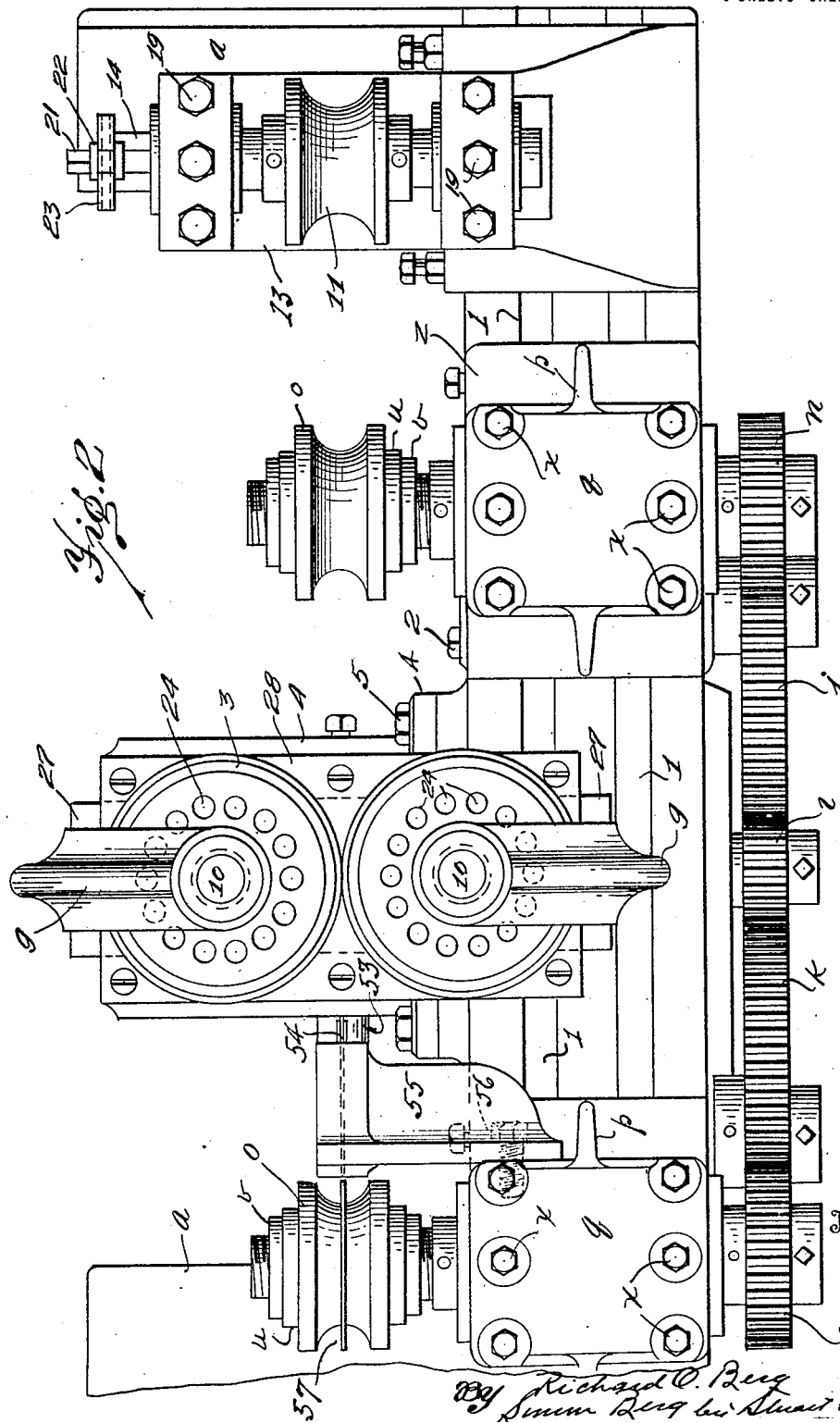

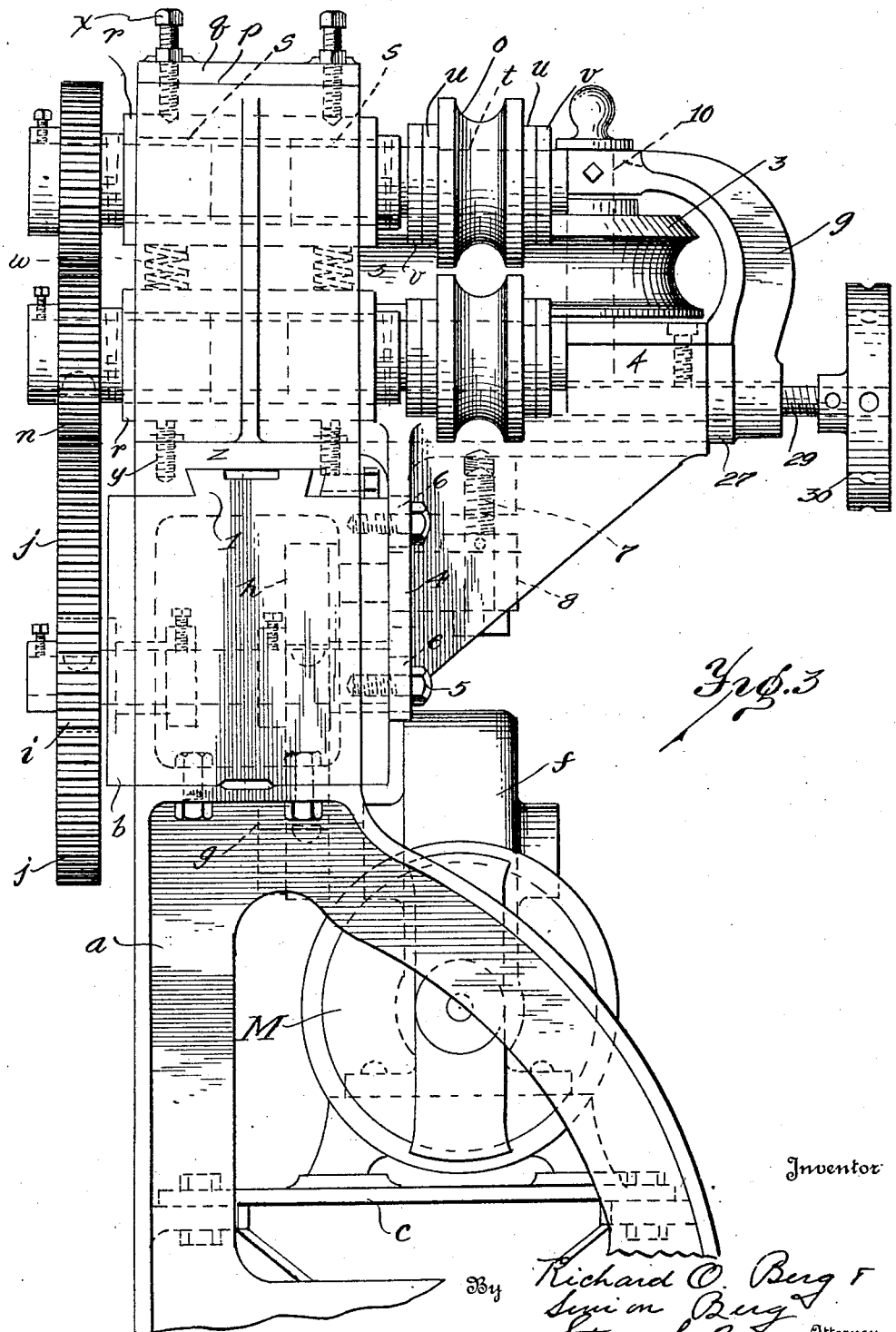

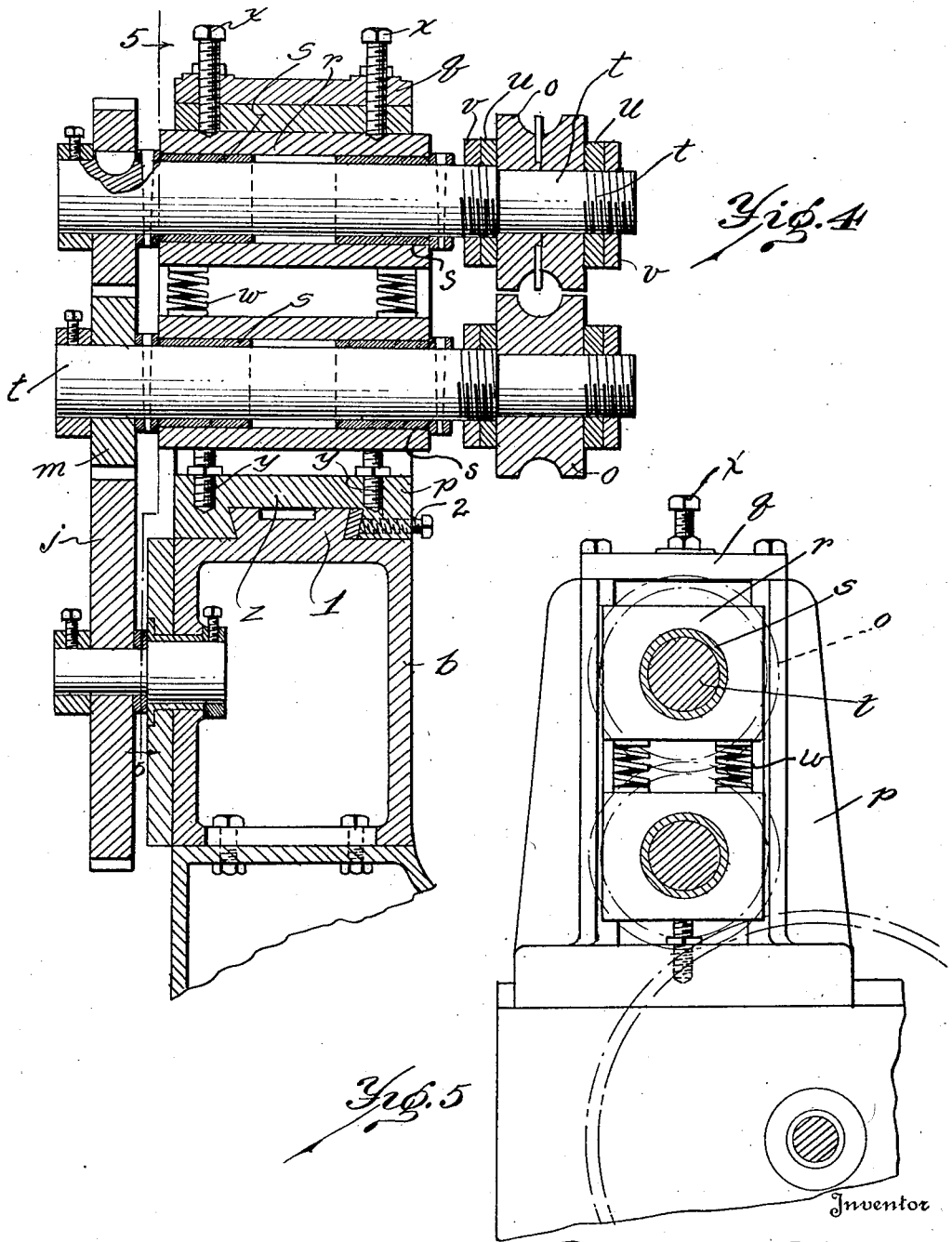

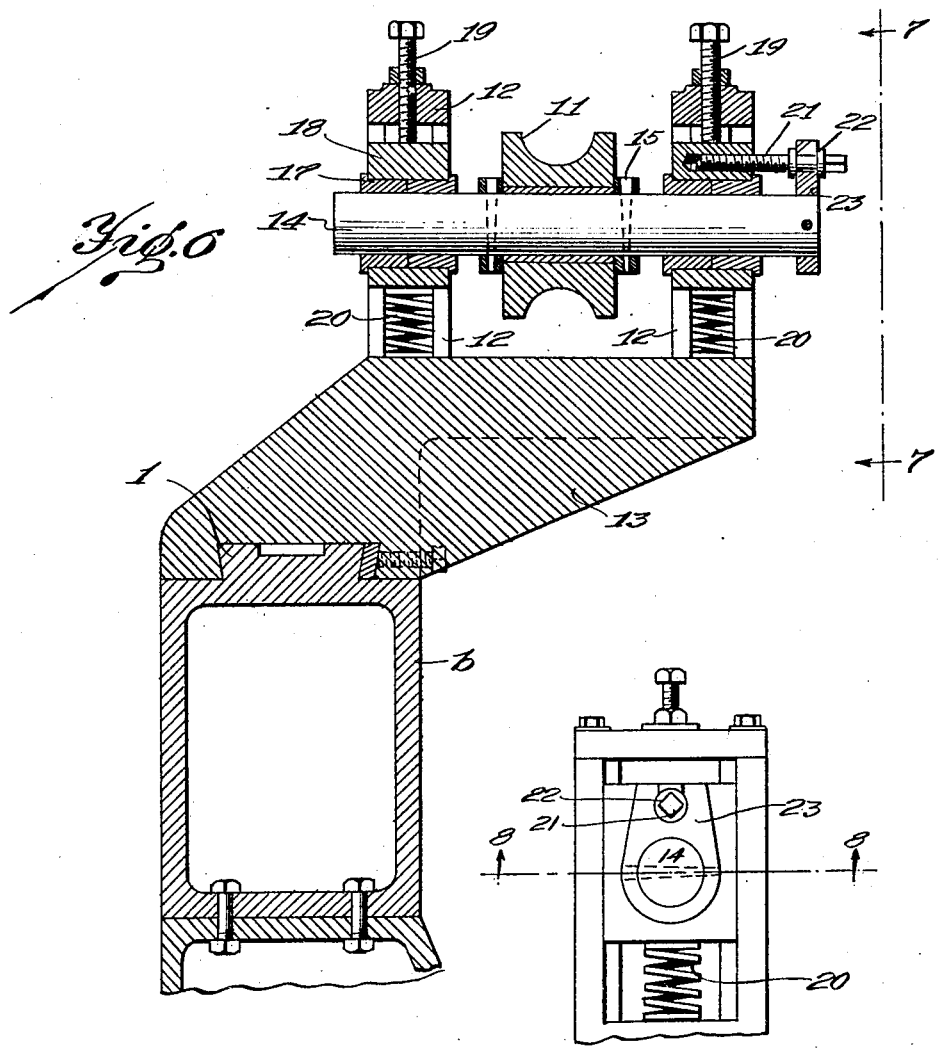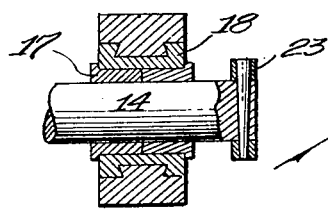

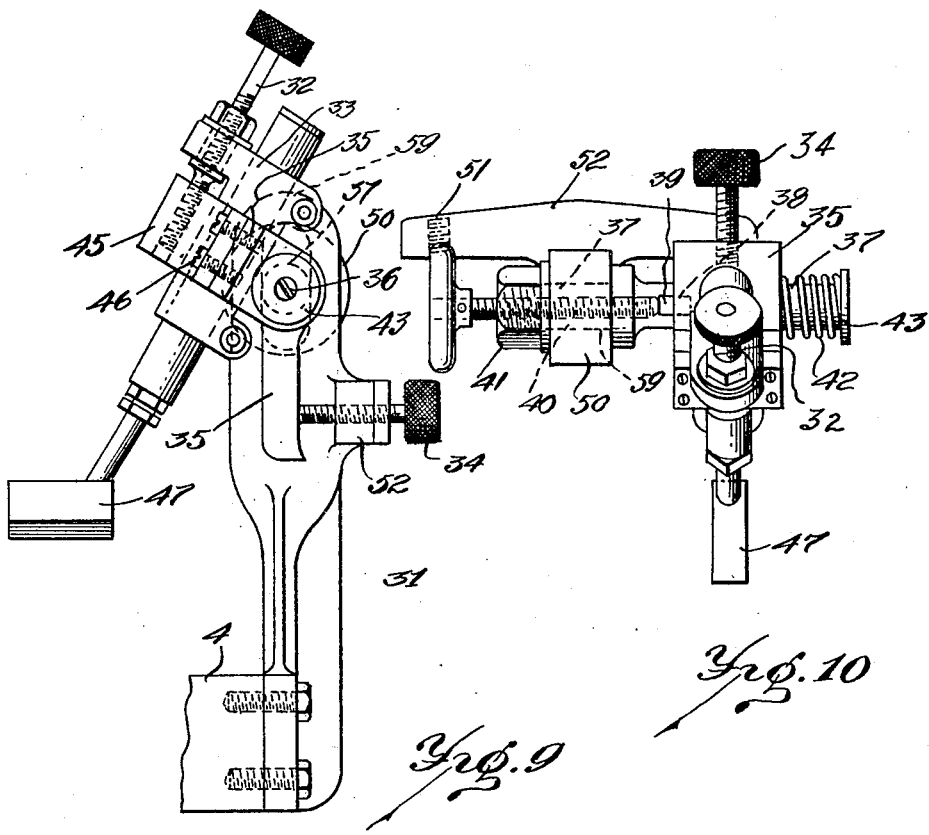
Fig. 9
Fig. 10
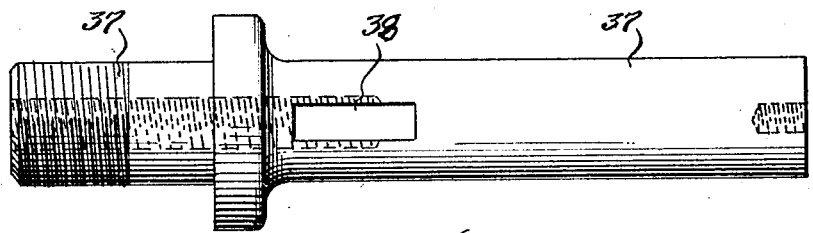
Fig. 11

RICHARD O. BERG AND SIMON BERG, OF DETROIT, MICHIGAN, ASSIGNORS TO MICHIGAN STEEL TUBE PRODUCTS CO., OF DETROIT, MICHIGAN, A CORPORATION OF MICHIGAN.

TUBE-WELDING MACHINE.

1,418,058. Specification of Letters Patent. Patented May 30, 1922.

Application filed July 12, 1920. Serial No. 395,434.

*To all whom it may concern:*

Be it known that we, RICHARD O. BERG and SIMON BERG, citizens of the United States, residing at Detroit, in the county of Wayne and State of Michigan, have invented certain new and useful Improvements in Tube-Welding Machines, of which the following is a specification.

This invention relates to tube welding machines, and has for its object a tube welding machine which has the feed rolls open at one side so that they may be removed or changed without removing the journal boxes, which has heretofore been necessary. Another feature of the construction is the arrangement of the welding rolls so that the same may be adjusted vertically. Still another feature is an arrangement which provides a support for the welding roll shafts at both top and bottom. This is a valuable feature as these welding rolls are subject to considerable strain inasmuch as they are used as pressure rolls. There are other features of novelty and structure arrangement which will more fully appear after a complete description of the machine is given.

In the drawings,—

Fig. 1 is a side elevation of the machine.

Fig. 2 is a plan view of the machine.

Fig. 3 is an end elevation of the machine taken from the right of Fig. 1 with the straightening roll set omitted for clearness.

Fig. 4 is a cross section on the line 4—4 of Fig. 1.

Fig. 5 is a section taken on the line 5—5 of Fig. 4.

Fig. 6 is a section on the line 6—6 of Fig. 1.

Fig. 7 is a view taken on the line 7—7 of Fig. 6.

Fig. 8 is a section on the line 8—8 of Fig. 7.

Fig. 9 is an enlarged side elevation of the torch and its support.

Fig. 10 is a front elevation of the same.

Fig. 11 is a detail of the special shaft that supports the torch holder.

$a$ designates the machine stand, to which is bolted a casting $b$ forming the bed of the machine. A cradle $c$ extends from one corner of the stand obliquely to the opposite corner of the stand (compare Figs. 1 and 3), providing a support for the electric motor M and the worm support $d$. The worm $e$ meshes with the spiral gear $f$ which has a pinion $g$ on the same shaft. This pinion drives the gear $h$ which is provided with a pinion $i$ on the same shaft which meshes with the large gear wheels $j$ and $k$ that drive the gear wheels $m$ and $n$ that rotate the feed rolls $o$. $p, p$ designate journal posts provided with cap plates $q$. These posts support the journal blocks $r$ in vertical sliding relation. These blocks are of considerable length and are each provided with a pair of bushings $s$ to give a two-point support for a relatively long roll shaft $t$ which is provided with two threaded portions between which is seated the roll $o$ held in adjusted relation upon the shaft by means of nuts $u$ and lock nuts $v$.

This arrangement of feed rolls is very advantageous. It will be seen that they are supported only on one side, leaving them open at the other side, which leaves the work much more open to observation and reach than is the case where the machine has a journal box and supports on both sides of the rolls, as is the customary construction. This facilitates the operation of the machine and is also advantageous when a change of rolls is necessary as it does not require the taking down of the journal boxes, etc. The journal blocks $r$ are spaced by coil springs $w$ and are adjustable vertically by means of the cap screws $x$ running through the cap plate $q$ and the screw studs $y$ running into the base $z$ of the journal posts $p$. It will be seen that these base portions are slidable on the dove-tail track 1 of the bed of the machine and hence by loosening the set screws 2 these feed roll sets may be adjusted longitudinally of the machine. Any adjustment of the rollers transversely of the bed can be secured by adjusting the roll along its shaft. This provides a substantial improvement over the old construction which usually required an adjustment of the roll set on the bed of the machine and required a separate cross-running carriage for this purpose. Furthermore, this adjustment permits an adjustment of either roll independently of the other roll.

The pressure or welding rolls are designated 3. They are both carried upon a separate bracket or casting 4. This bracket 4 is bolted to the side of the machine by the bolts 5 that pass through vertical slots 6 (Fig. 3) which permits the bracket bearing the two pressure rolls to be adjusted vertically by the adjusting screw 7 that passes through the lug 8 projecting from the bed of the machine. A slide 27 is transversely slidable in the bracket 4 and at each end of the slide is an elbow-like arm 9 arranged to form a support for the shaft 10 upon which the welding rolls 3 rotate. In the customary construction heretofore employed this shaft has had support only at its lower end and often in the course of time gets out of true. This improvement is considered a considerable advantage as these pressure rolls are subjected to considerably more strain than the feed rolls as they exert the pressure necessary to press the two edges of the tubing together for the purpose of uniting the heated edges.

It will be noticed that the straightening roll 11 (Figs. 6–8) is supported by the journal box posts 12 that are in turn supported on an offset carriage 13 movable longitudinally of the machine bed by reason of being mounted on the dove-tailed track 1. This straightening roll is rotatably supported upon the straightening roll shaft 14 by means of the collars and the wedging keys 15. The straightening roll shaft is slidable in the bushings 17 that are carried in the journal boxes 18 that are adjustable vertically by means of the cap screws 19 in connection with coil springs 20. Adjustment of the roll laterally of the bed is secured by means of turning the screw 21 which is provided with a pair of collars 22 that embrace the fork 23 pinned to the shaft 14. Hence by turning this screw 21 the shaft may be caused to move longitudinally thereby moving the straightening roll 11 transversely of the bed of the machine.

The rolls instead of being water-cooled, as is the customary practice, are provided with drilled holes 24 which gives a larger air contact area to dissipate the heat.

The curved arms 9, as already explained, are carried on a slide 27 which moves in the bracket 4 transversely of the machine. The cover plate 28 holds the slide in place. This slide is moved in and out with respect to the brackets to afford a transverse adjustment for the welding rolls by means of the screw 29 and hand wheel 30.

Another feature of the bracket or support for the welding rolls is that it permits the torch post 31 (Fig. 1) to be bolted directly to the side of the bracket 4 so that any vertical adjustment of the rolls always carries the torch with it and does not vary the adjustment of the torch with respect to the rolls.

The torch is held by a clamp 33 slidable in the arm of the bell-crank holder 35 and adjustable in such sliding relation by the screw 32. The holder 35 pivots on the shaft 37. The shaft 37 may be held in various positions of vertical adjustment by reason of the slot 59 in the bearing 50 and the jam-nut 41. By turning the set screw 34 the angular position of the torch may be varied to suit the exigencies. The torch may be adjusted laterally to bring it into registry with the seam of the tubing by the devices shown in Fig. 10. The shaft 37 is slotted at 38. A bar 39 is inserted in this slot. A screw 40 runs through the center of the shaft and its end engages the bar 39. The screw may be turned to press the bar 39 and torch to the right or to release the bar and allow the spring 42 to press the holder to the left. An abutment 43 in the form of a disk is provided for the spring and held to the end of the shaft by the screw 36. It will be seen that the upper arm of the holder 35 includes a cap plate 45 which may be bolted to the body of the holder by the cap screws 46. This allows the assembling of the torch clamp 33 slidably in the holder 35. The holder, clamp and torch may be mounted upon either side of the bearing 50 of the support by simply turning the shaft 37 around and inserting the set screw 34 in the other socket 51 of the cross arm 52.

From the above description it will be evident that the torch tip 47 may be caused to register or be aligned with the seam of the tubing by the lateral adjustment secured by turning the screw 40. To get the proper angular position of the bottom of the tip with respect to the tubing the set screw 34 is used. To get the proper distance between the tubing and tip the set screw 32 is turned to cause the clamp 33 to slide in the holder 35. Hence the torch tip has a universal adjustability within given limits, and this universal adjustability is secured by three separate and individually lockable screw adjustments that make for the utmost precision in getting and maintaining this adjustment, while the initial rough adjustment may be secured by moving the shaft 37 in the slot 59 of the torch post 31.

The tube is guided to the torch tip primarily by the mandrel 53 and fin 54 which are carried by the mandrel support 55 bolted to the post $p$ by the bolts 56 (Fig. 1). If additional guiding means is desired a fin 57 may be used in the upper guide roll, but this is not necessary. The fin and mandrel are claimed in a previous patent, Kritz No. 1,296,970.

What we claim is:

1. In a tube welding machine, the combination of roll shaft supports, roll shafts rotatably supported in said supports but free from support at one end, and tube rolls supported on such free ends of said shafts and removable from such ends freely, and nuts threaded on such ends of said shafts and on both sides of the rolls for adjustably supporting the rolls on the shafts.

2. In a tube welding machine, the combination of a bed, a pair of horizontally disposed welding rolls, a bracket for supporting the welding rolls as a unit, and means for adjusting the bracket vertically on the said bed.

3. In a tube welding machine, the combination of horizontally-disposed welding rolls, one of the rolls having a roll shaft which extends both above and below the roll, a support for rotatably holding that portion of the roll shaft below the roll, and a support for rotatably holding the portion of the shaft above the roll.

4. In a tube welding machine, the combination of a bed, welding rolls horizontally disposed on said bed, and shafts for supporting said welding rolls supported at their lower ends, and arms for supporting the upper ends of the welding roll shafts.

5. In a tube welding machine, the combination of a bed, a plurality of welding rolls, a bracket for supporting the welding rolls on the bed, vertical shafts for supporting the welding rolls, the lower ends of the welding roll shafts being supported, curved arms supported at their lower ends and supporting the upper ends of the roll shafts.

6. In a tube welding machine, the combination of a plurality of horizontally-supported welding rolls, vertical shafts for supporting the same, a support for the lower end of the vertical shafts, and curved arms secured at their lower ends to said support and curving over and supporting the upper ends of the welding roll shafts.

7. In a tube welding machine, the combination of journal posts, a journal block supported in said journal posts, longitudinally-spaced bushings in each journal block relatively long roll shafts supported in said bushings but having one end projecting beyond said bushings and free from support, and feed rolls supported and freely removable from the said projecting ends of said feed roll shafts.

8. In a tube welding machine, the combination of journal posts, journal blocks supported in said posts, each journal block being provided with longitudinally-spaced bushings, feed roll shafts supported in said bushings and being relatively long in extent and free from support at one end, and feed rolls supported at the unsupported ends of the said feed roll shafts and freely removable from such ends of feed roll shafts.

9. In a tube welding machine, the combination of journal posts, journal blocks supported in said posts, each journal block provided with a pair of longitudinally-spaced bearing members, relatively long feed roll shafts supported in said bearing members but free from support at one end, the unsupported ends of said feed roll shafts being threaded at two places, feed rolls supported on said ends between the two threaded zones, and nuts for adjustably supporting the said feed rolls upon such ends of the shafts and allowing them to be freely removable therefrom.

10. In a tube welding machine, the combination of a support provided with a vertical slot, a shaft adjustable roughly in said vertical slot, a torch holder that pivots on said shaft, and means for accurately turning said holder on said shaft to get an accurate adjustment.

11. In a tube welding machine, the combination of a torch support, a shaft carried thereby, a torch holder slidable and also rotatable upon said shaft, a screw for angularly adjusting the holder about the shaft, and a screw and spring for sliding the holder longitudinally of the shaft and laterally of the tube.

12. In a tube welding machine, the combination of a support, a shaft carried by the support, a holder pivotally mounted on said shaft and also slidably mounted thereon, a spring coiled about said shaft tending to slide the holder along said shaft, and a screw running longitudinally through the shaft and having connection with the holder for adjusting the holder along the shaft against the thrust of the spring.

13. In a tube welding machine, the combination of a torch support, a shaft carried thereby, a torch holder slidable therealong, a spring tending to slide the holder therealong, and a screw adjustable on the shaft for adjusting the position of the holder against the thrust of the spring.

14. In a tube welding machine, the combination of a torch support, a shaft carried thereon, a bell-crank-like holder rotatably mounted on said shaft for holding the torch, and a screw passing through the support for engaging the lower arm of the holder to adjust the angular position of the holder and torch about said shaft.

15. In a tube welding machine, the combination of a torch support provided with a cross arm 52 having screw sockets at each end, a shaft carried by the top end of the support, a torch holder in the form of a bell-crank lever that can be slipped on the shaft at either side of the top of the torch support, and a screw which may be engaged in either screw socket in the cross bar 52 against the lower arm of the bell-crank to secure the angular adjustment of the holder about the shaft.

16. In a tube welding machine, the combination of a torch support, a torch holder rotatably supported thereupon, a torch clamp slidable up and down in said torch holder, and a screw engaging the torch clamp and threaded into the torch holder for adjusting the torch clamp up and down in the torch holder.

17. In a tube welding machine, the combination of a torch support, a torch holder thereupon including a cap plate, a torch clamp which may be assembled slidably into the torch holder for up and down movement by releasing the cap plate, and means for adjusting the torch clamp up and down in the said torch holder.

18. In a tube welding machine, the combination of a bed, welding rolls, a bracket adjustable vertically on the bed, a slide slidable transversely of said bracket and carrying the welding rolls, and means for sliding the slide transversely of the bracket and holding it in adjusted position.

19. In a tube welding machine, the combination of a pair of journal posts, journal blocks vertically slidable between the posts, feed roll shafts journaled in said blocks, coil springs spacing said blocks, adjustable means for thrusting the upper journal block downwardly against the thrust of the springs, and adjustable means for thrusting the lower journal block upwardly against the thrust of the springs.

20. In a tube welding machine, the combination of journal posts, base portions for said journal posts, journal blocks slidable vertically between the posts, roll shafts journaled in said journal blocks, springs for spacing the journal blocks, a cap plate connecting the journal posts at the top, a screw for thrusting downwardly on the upper journal block through the cap plate, and threaded studs for thrusting upwardly on the lower journal block, said threaded studs turning into the journal post base.

In testimony whereof we affix our signatures.

RICHARD O. BERG.
SIMON BERG.